UNITED STATES PATENT OFFICE.

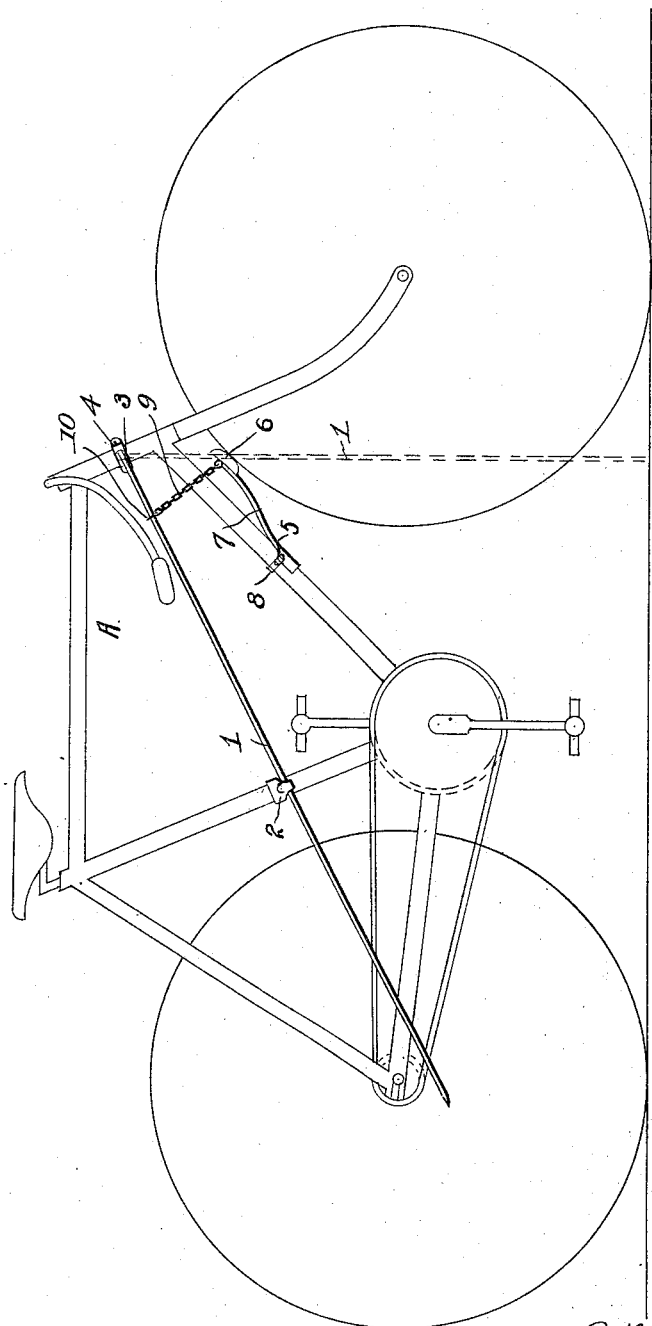

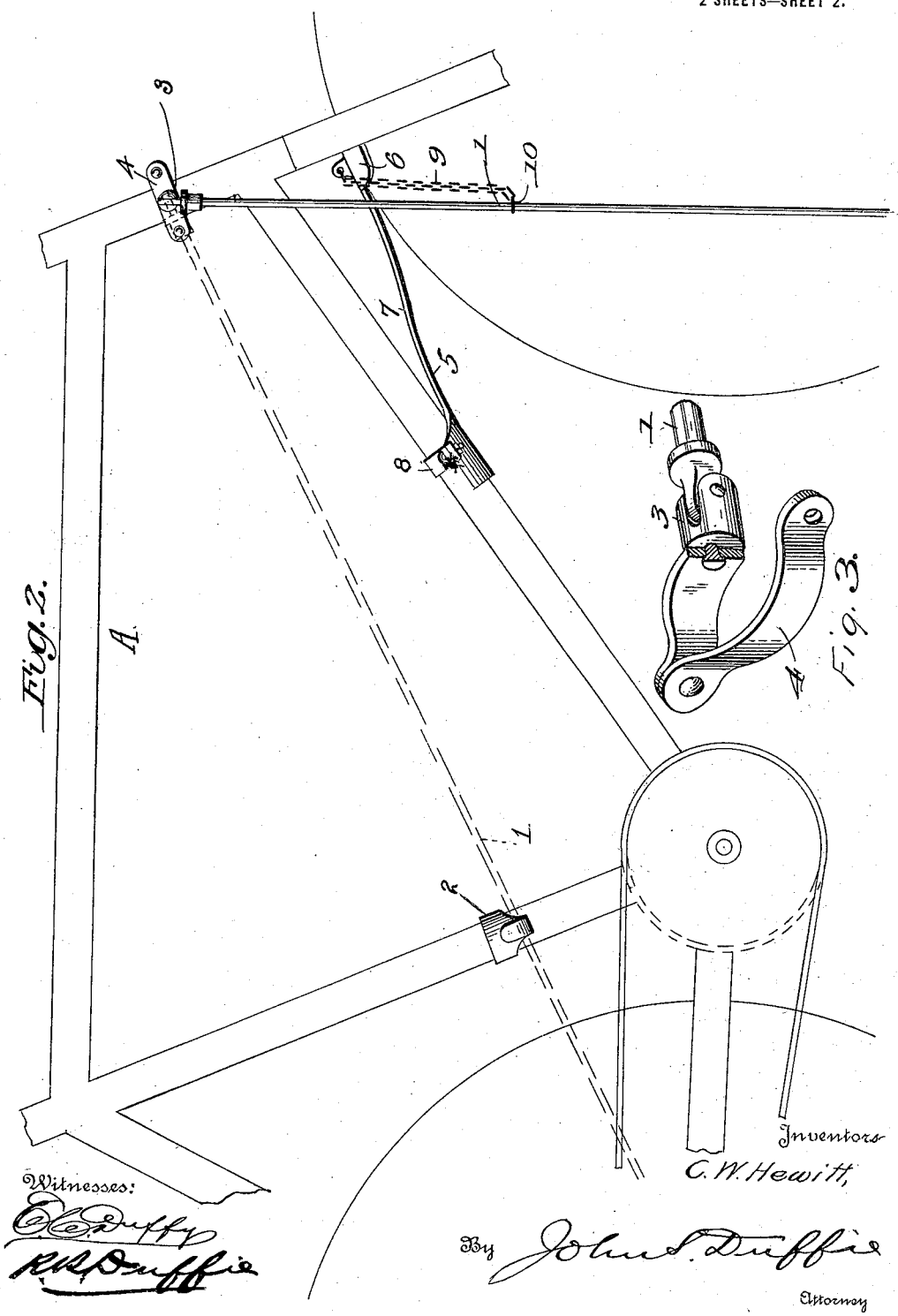

COLUMBUS W. HEWITT, OF DARLINGTON, SOUTH CAROLINA.

BICYCLE-PROP.

1,201,465.   Specification of Letters Patent.   Patented Oct. 17, 1916.

Application filed April 23, 1915.   Serial No. 23,508.

*To all whom it may concern:*

Be it known that I, COLUMBUS W. HEWITT, a citizen of the United States, residing at Darlington, in the county of Darlington and State of South Carolina, have invented certain new and useful Improvements in Bicycle-Props, of which the following is a specification.

This invention relates to improvements in bicycles, more especially to props and brakes therefor.

The invention has for its object to provide for readily or conveniently propping the device in upright position at "stand still", or when not being ridden.

A further object is to provide for conveniently and suitably braking the machine, as may be required in aiding the controlling thereof, when in propped position.

A still further object is to provide for carrying out the aforesaid ends in a simple and effective manner and at the minimum cost.

The invention consists therefore of certain instrumentalities and features of construction substantially as hereinafter fully disclosed and defined by the appended claims.

In the accompanying drawings, which are in evidence of the preferred embodiment of my invention but which may be variously changed and modified as circumstances may call for, Figure 1 is a side elevation of a bicycle with my invention applied thereto, the "hitcher" or propping attachment being shown in full lines, as when out of use, and in dotted lines as when in practical use. Fig. 2 is a similar general view thereof with the "hitcher" or propping attachment shown in full lines as when in use and in dotted lines as when not in use. Fig. 3 is a perspective view, partially in section, of the universal joint employed in pivoting one end of the prop to the bicycle frame.

In carrying out my invention, I provide a suitable, preferably lower end pointed rod or member 1, which may be termed locally a "prop" and which is attached at its upper end to the forward end of a bicycle, designated as A, for the retention of the bicycle upright, at "stand-still", or when not being ridden. The connection between the bicycle and prop is effected by suitably pivoting the upper end of the latter at its point of connection with the bicycle frame so as to allow of the movement of the prop from its position of rest, in which it is supported at its free end upon a hook or bracket 2 suitably secured to the bicycle-frame, to a vertical position as disclosed by full and dotted lines. The pivoting of the prop is preferably effected through a universal joint 3 mounted on a bracket 4 suitably clamped to the bicycle-frame, so as to be swung forwardly and rearwardly in a vertical plane as will be appreciated. The action of the prop, it will be readily seen, is to provide for propping the bicycle in upright position, with the pointed lower end of the prop anchored or thrust into the ground, as will be readily understood from Figs. 1 and 2.

A brake 5 is suitably provided, which brake terminates at its free end in a wheel engaging member or shoe 6, secured thereto or formed integral therewith as preferred. The main portion of the brake 5 consists of a resilient metal member 7, the stationary end of which is suitably connected or clamped, at 8, to the bicycle frame.

A flexible or chain connection, as 9, is interposed between the brake and the prop or propping member 1. That end of the chain or flexible member, which is secured to the shoe 6, is fixed, while that end of the chain or flexible member, which is connected to the prop 1 is secured thereto slidably by means of a ring 10, the purpose of which is to permit the free movement of the chain with respect to the prop, during the operation of changing the prop from propped position, as seen in Fig. 2 to unpropped position as seen in Fig. 1, or the reverse.

The operation of my invention is as follows: The prop 1 being in unpropped position (Fig. 1) or position of rest, and it is desired to place it in the propped position, first, the free end of the prop is disengaged from the hook 2 and swing around to any desired angle, with respect to the bicycle or ground, by means of said universal joint or connection, then, its lower pointed end is inserted into the ground (or whatever it contacts). Simultaneously the chain 9 releases the spring-held shoe 6 to contact the forward wheel of the bicycle, thereby preventing movement on the part of the same. The ring 10 encircling the prop drops loosely to any position on the same. In reversing the operation, the prop is disengaged from the ground and raised, being again put into engagement with hook 2. As the prop is raised the chain 9 becomes, first, taut, then raises the shoe 6, from contact with the periphery of said wheel of the bicycle. The ring 10 automatically assumes the most advantageous position with respect to the prop 1, to enable the device to operate expeditiously.

I claim—

1. In a bicycle a prop adapted to be swung at certain angles with the perpendicular, and means coöperating with the prop to halt the movement of the bicycle in any direction whatever, when in supported position, said last mentioned means including a brake shoe, resilient means to control said shoe in throwing it in contact with one wheel of the bicycle, when in propped position, and means coöperating with the prop to disengage the shoe from contact with the wheel when the prop assumes its non-supporting position, said prop being pivoted to a front frame part of the bicycle adjacent the brake shoe.

2. In a bicycle a prop adapted to be swung at certain angles with the perpendicular, and means coöperating with the prop to halt the movement of the bicycle in any direction whatever, when in propped position, said last mentioned means including a brake shoe, resilient means to control said shoe in throwing it in contact with one wheel of the bicycle, when in propped position, and means coöperating with the prop to disengage the shoe from contact with the wheel when the prop assumes its non-supporting position, said last mentioned means comprising a flexible member interposed between the brake shoe and said prop, said prop being pivoted to a front frame part adjacent the brake shoe.

3. In a bicycle a prop adapted to be swung at certain angles with the perpendicular, and means coöperating with the prop to halt the movement of the bicycle in any direction whatever, when in propped position, said last mentioned means including a brake shoe, resilient means to control said shoe in throwing it in contact with one wheel of the bicycle, when in propped position, and means coöperating with the prop to disengage the shoe from contact with the wheel when the prop assumes its non-supporting position, said last mentioned means comprising a flexible member interposed between the brake shoe and said prop, said flexible member being secured at one of its ends to the shoe while the other end is loosely connected to the prop, said prop being pivoted to a front frame part adjacent the brake shoe.

In testimony whereof I affix my signature in presence of two witnesses.

COLUMBUS W. HEWITT.

Witnesses:
T. D. SLIGH,
S. E. TIPTON.